(12) United States Patent
Yasuda et al.

(10) Patent No.: US 11,590,679 B2
(45) Date of Patent: Feb. 28, 2023

(54) INJECTION MOLDING MOLD

(71) Applicant: HONDA MOTOR CO., LTD., Tokyo (JP)

(72) Inventors: Masahiro Yasuda, Tochigi-ken (JP); Tsuyoshi Makihara, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 16/957,393

(22) PCT Filed: Oct. 26, 2018

(86) PCT No.: PCT/JP2018/039860
§ 371 (c)(1),
(2) Date: Jun. 24, 2020

(87) PCT Pub. No.: WO2019/130785
PCT Pub. Date: Jul. 4, 2019

(65) Prior Publication Data
US 2020/0324448 A1    Oct. 15, 2020

(30) Foreign Application Priority Data
Dec. 28, 2017   (JP) .............................. JP2017-253261

(51) Int. Cl.
*B29C 45/26*      (2006.01)
*B29C 45/40*      (2006.01)

(52) U.S. Cl.
CPC ...... *B29C 45/2606* (2013.01); *B29C 45/4005* (2013.01); *B29C 2945/76083* (2013.01)

(58) Field of Classification Search
CPC ..... B29C 45/22; B29C 45/1866; B29C 45/13; B29C 2045/1726; B29C 2045/135;
(Continued)

(56) References Cited

U.S. PATENT DOCUMENTS 4,699,581 A * 10/1987 Nagasaka ........... B29C 45/5008
                                                    425/574
6,811,391 B1 * 11/2004 Klaus .................. B29C 45/4005
                                                    425/444

FOREIGN PATENT DOCUMENTS

CN     103171102     6/2013
JP     2003-245957   9/2003

OTHER PUBLICATIONS

International Search Report and Written Opinion for International Application No. PCT/JP2018/039860 dated Dec. 25, 2018, 10 pages.

(Continued)

*Primary Examiner* — Francisco W Tschen
*Assistant Examiner* — Elisa H Vera
(74) *Attorney, Agent, or Firm* — Amin, Turocy & Watson, LLP

(57) ABSTRACT

The present invention pertains to an injection molding mold that can extrude the entirety of a workpiece from a cavity even when the cavity is enlarged so as to extend further than the outer side of an ejector plate. The injection molding mold may include a mold member having a cavity formed on the front side, a mold frame supporting the mold member from the back side, an ejector plate provided in the space within the mold frame so as to ascend and descend freely therein, a first workpiece extrusion means for extruding the workpiece above the ejector plate, and a second workpiece extrusion means for operating in conjunction with the first workpiece extrusion means and extruding the workpiece formed in the cavity in an area that is further to an outer side than the ejector plate.

12 Claims, 5 Drawing Sheets

(58) Field of Classification Search
CPC .......... B29C 2045/0089; B29C 33/442; B29C 44/4435; B29C 45/2606; B29C 45/401; B29C 45/4005; B29C 45/44; B29C 2045/4015; B29C 2045/4021; B29C 2045/4026; B29C 2945/76725
See application file for complete search history.

(56) References Cited

OTHER PUBLICATIONS

Chinese Office Action for Chinese Patent Application No. 201880084460.3 dated Jul. 23, 2021.

\* cited by examiner

INJECTION MOLDING MOLD

TECHNICAL FIELD

The present invention relates to an injection molding mold.

BACKGROUND ART

In injection molding, there is employed a mold that comprises: a fixed-side mold member where a cavity is formed and a movable-side upper mold; and a mold frame supporting the mold member. Moreover, during injection molding, there is performed a step in which the fixed-side mold member is pressed against by the upper mold while being supported by the mold frame, the cavity is injected with a molten resin, the molten resin is cooled and solidified, and then a workpiece is removed.

Moreover, it is known that, in order to facilitate removal of the workpiece, there is provided an extrusion unit for extruding the workpiece within the cavity from a rear surface side of the mold member.

For example, in a mold disclosed in Japanese Laid-Open Patent Publication No. 2003-245957, a freely ascending/descending ejector plate is disposed in a space on an inner side of a mold frame supporting a mold member, and an extrusion pin extending out upwardly is provided to that ejector plate. The extrusion pin is inserted in a through-hole penetrating to the cavity from a back side of the mold member. Moreover, by raising the ejector plate, the extrusion pin is projected into the cavity to extrude the workpiece from the cavity.

SUMMARY OF INVENTION

However, in a conventional injection molding mold, if, in order to handle an increase in size of the workpiece, the cavity is enlarged to an outer side of the ejector plate, then the extrusion pin cannot be disposed in a region on the outer side of the ejector plate. Therefore, in a conventional injection molding mold, there arises a problem that the workpiece on the outer side of the ejector plate cannot be extruded from the cavity.

Hence, there is desired an injection molding mold that can extrude the whole of a workpiece from a cavity even when the cavity has been increased in size to an outer side of an ejector plate.

One aspect of the present invention is an injection molding mold comprising: a mold member including a cavity formed on a front side, and first and second through-holes that communicate with the cavity and penetrate in a plate thickness direction; a mold frame configured to support the mold member from a back side; a first workpiece extrusion unit including an ejector plate provided in a freely ascending/descending manner in a space within the mold frame, and a first extrusion pin extending out upwardly from the ejector plate, the first extrusion pin being inserted in the first through-hole from the back side of the mold member and configured to extrude a workpiece from the cavity; and a second workpiece extrusion unit including a second extrusion pin inserted in the second through-hole, the second workpiece extrusion unit being configured to operate in conjunction with the first workpiece extrusion unit in such a manner that operation start timings thereof match, and to extrude the workpiece formed in the cavity in a region on an outer side of the ejector plate.

According to the injection molding mold configured as described above, the second workpiece extrusion unit operates on the cavity formed on the outer side of the ejector plate, in conjunction with the extrusion operation of the workpiece by the first workpiece extrusion unit in such a manner that operation start timings thereof match, and thereby extrudes the workpiece. According to such an injection molding mold, the whole of the workpiece can be extruded from the cavity even when the cavity has been increased in size to the outer side of the ejector plate.

In the above-described injection molding mold, a mold frame through-hole communicating with the second through-hole may be formed within the mold frame, and the second extrusion pin may be inserted in the mold frame through-hole and the second through-hole. According to this configuration, the second workpiece extrusion unit can be disposed without reducing thickness of the mold frame, and lowering of strength of the mold frame can be suppressed.

In the above-described injection molding mold, there may be formed a cut-out section formed in a lower end section of the mold frame and communicating with the mold frame through-hole, and a drive unit configured to drive the second extrusion pin may be provided inside the cut-out section. According to this configuration, the cut-out section is provided in a mold frame lower section where it is difficult for an effect to be exerted on strength of the mold frame, so lowering of strength of the mold frame can be suppressed.

In the above-described injection molding mold, the drive unit may be provided with an elastic member, and the second extrusion pin may be driven by a biasing force of the elastic member. According to this configuration, the second extrusion pin can be driven merely by the biasing force of the elastic member, without a complicated power source being required, hence the second workpiece extrusion unit can be simplified.

In the above-described injection molding mold, the drive unit may be provided with: an extrusion plate connected to a lower end section of the second extrusion pin; an elastic member configured to raise the extrusion plate; and a support section formed integrally with the ejector plate, and configured to obstruct rise of the extrusion plate by pressing the extrusion plate at a lowered position of the ejector plate, and release pressing of the extrusion plate at a raised position of the ejector plate at which the first extrusion pin projects from the cavity. According to this configuration, operation of the second extrusion pin can be performed in conjunction with that of the first extrusion pin without a complicated control unit being required, and the second workpiece extrusion unit can be simplified.

In the above-described injection molding mold, there may be adopted a configuration such that the extrusion plate is provided on an inner side of the cut-out section formed in the lower end section of the mold frame, and is abutted on an upper end of the cut-out section in a state where pressing by the support section has been released. According to this configuration, rise of the second extrusion pin due to the biasing force of the elastic member can be stopped at a position of the upper end of the cut-out section, and a stroke of the second extrusion pin can be regulated without a complicated control mechanism being employed.

In the above-described injection molding mold, the stroke of the second extrusion pin may be made smaller than a stroke of the first extrusion pin. According to this configuration, volume of the cut-out section formed in the mold frame can be reduced, and lowering of rigidity of the mold frame due to the cut-out section can be suppressed.

In the above-described injection molding mold, the extrusion plate may be guided in an ascending/descending direction by a guide section provided in the mold frame, and the elastic member may be installed at a position between a plurality of the guide sections in the extrusion plate. According to this configuration, the extrusion plate is guided smoothly by the biasing force of the elastic member, and it becomes easier for the extrusion plate to undergo ascending/descending operation.

In the above-described injection molding mold, the support section may be disposed opposing the elastic member. According to this configuration, a pressing region of the extrusion plate by the support section and an acting region of the biasing force of the elastic member coincide, leading to the extrusion plate smoothly undergoing ascending/descending operation.

In the above-described injection molding mold, the extrusion plate may be provided on a lower side of the ejector plate. According to this configuration, it becomes possible for the cut-out section of the mold frame to be provided on a mold frame lower section side where there is little effect on rigidity.

In the above-described injection molding mold, the second extrusion pin may be made longer than the first extrusion pin. According to this configuration, it becomes possible for the cut-out section of the mold frame to be provided on the mold frame lower section side where there is little effect on rigidity.

In the above-described injection molding mold, the second extrusion pin may extrude an end section in a longitudinal direction of the cavity. According to this configuration, the hard-to-be-detached end section in the longitudinal direction of the cavity can be easily extruded.

In the above-described injection molding mold, the extrusion plate may be disposed divided into a plurality of portions, each of which is provided with one or a plurality of the second extrusion pins. According to this configuration, even in the case of there being provided a plurality of the second extrusion pins located in separated positions, the cut-out sections of the mold frame housing the extrusion plates are downsized and dispersedly disposed. As a result, lowering of rigidity of the mold frame can be suppressed.

According to the above-described injection molding mold, even in the case where the cavity has been enlarged to the outer side of the ejector plate, the whole of the workpiece can be extruded from the cavity, and an increase in size of the workpiece can be handled.

DESCRIPTION OF EMBODIMENTS

Preferred embodiments of an injection molding mold according to the present invention will be presented and described below with reference to the accompanying drawings.

Figure 1:
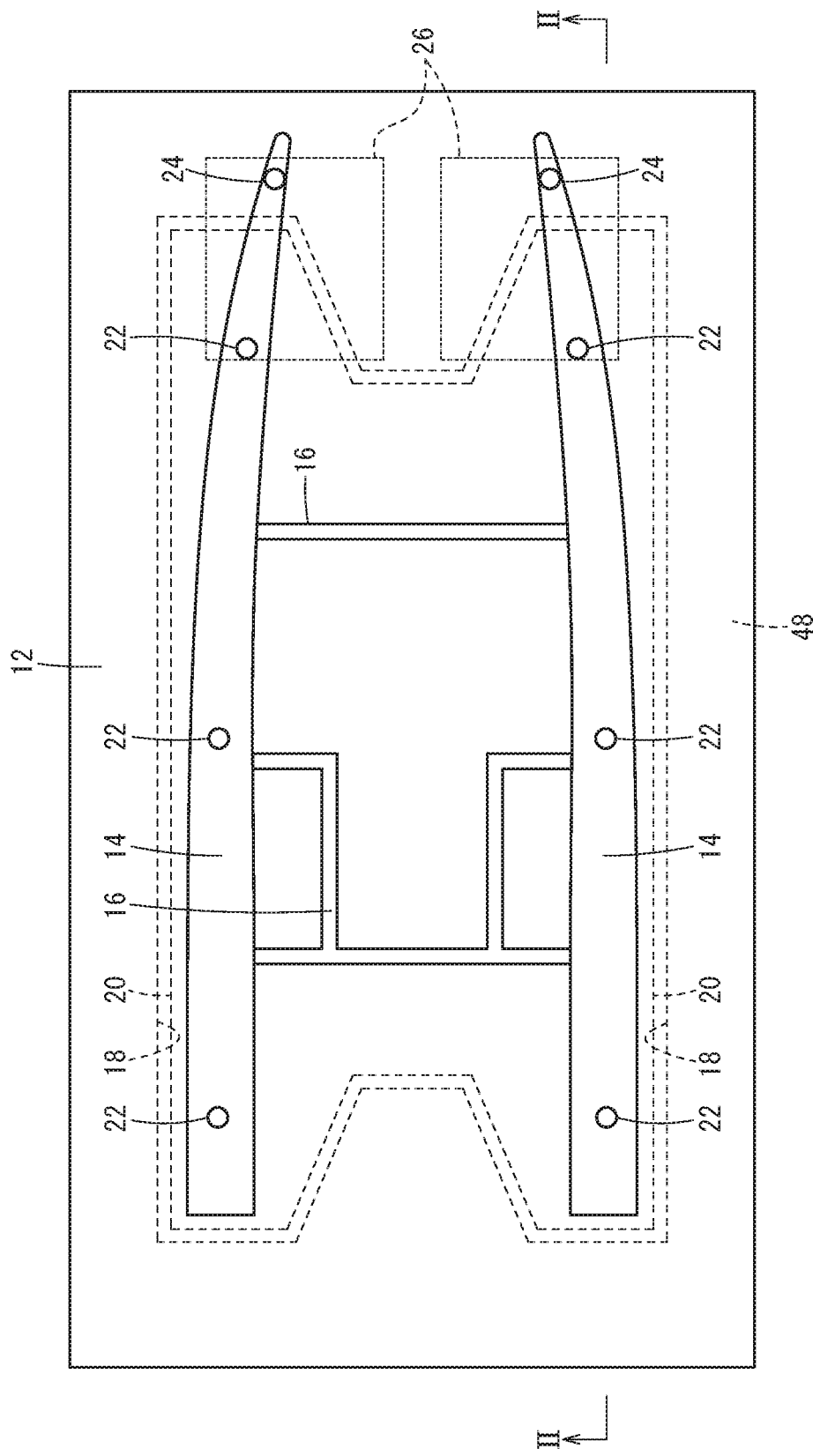
FIG. 1 is a plan view of an injection molding mold according to an embodiment of the present invention.
Figure 2:
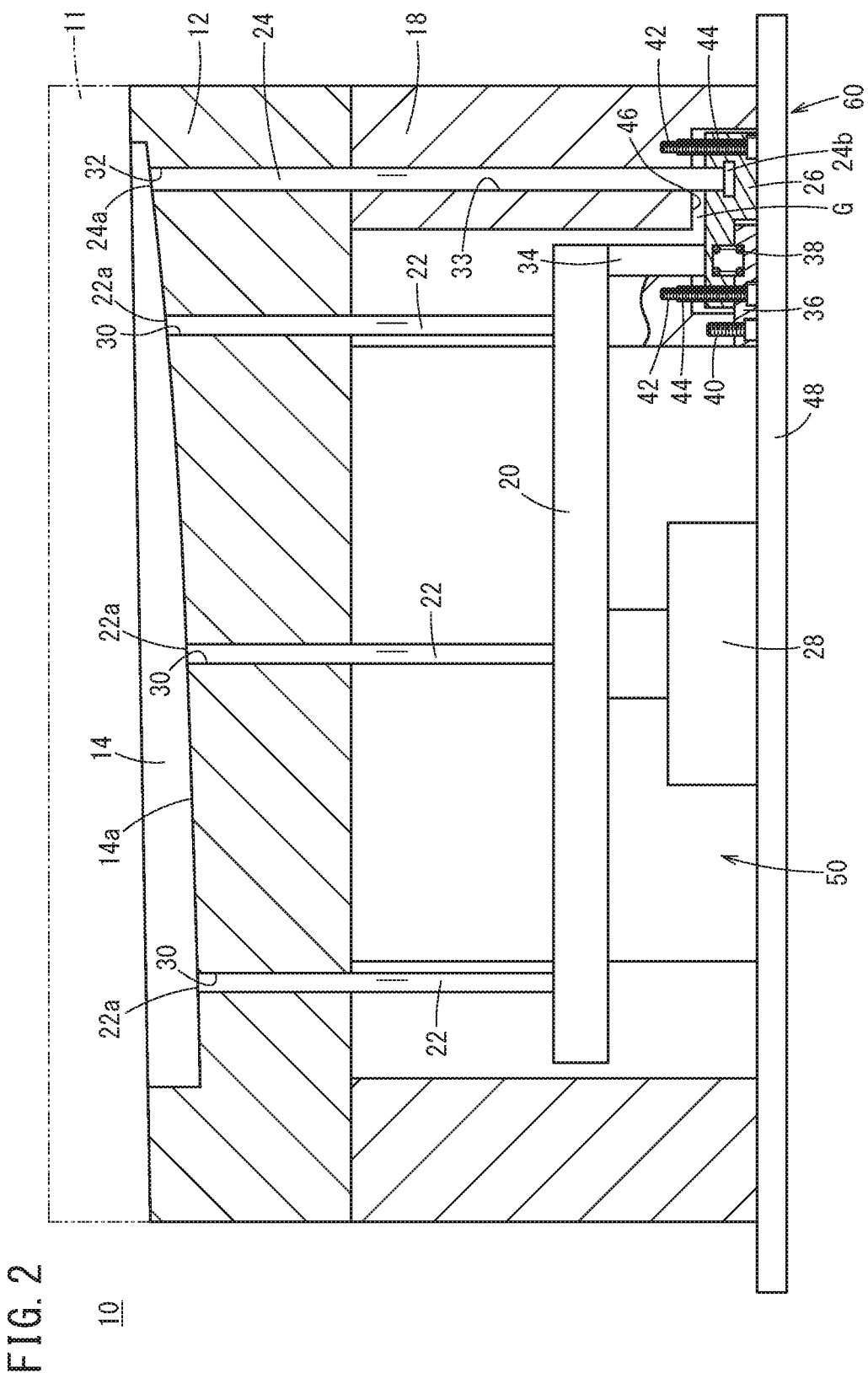
FIG. 2 is a cross-sectional view taken along the line II-II of FIG. 1.

FIG. 1 is a plan view of an injection molding mold 10 according to a first embodiment of the present invention, and FIG. 2 is a cross-sectional view taken along the line II-II of FIG. 1. This injection molding mold 10, which is disposed on a base 48 and employed in injection molding, is configured so as to extrude a molded workpiece by first and second workpiece extrusion units 50, 60.

That injection molding mold 10 includes: a mold member 12 employed in injection molding by being pressed against by an upper mold 11 from a front side; a mold frame 18 supporting the mold member 12 from a back side; an ejector plate 20 provided in a space within the mold frame 18; and the first workpiece extrusion unit 50 and the second workpiece extrusion unit 60 that extrude the workpiece.

First, the mold member 12 will be described. As shown in FIGS. 1 and 2, the mold member 12 is provided with a cavity 14, a gate 16, and first and second through-holes 30, 32.

The cavity 14, which is provided on a front side (an upper surface) of the mold member 12, forms a space to be injected with a resin when the upper mold 11 (refer to FIG. 2) is superposed. The cavity 14 is formed in a shape appropriate to a desired workpiece. In the example of FIG. 1, two cavities 14 are provided in order to form two long narrow workpieces.

The gate 16, which is formed groove-like on a surface of the mold member 12, communicates with the cavity 14. A molten resin passes through an unillustrated resin supply path within the mold member 12, and is portioned out by the gate 16 to be injected into the cavity 14 from a plurality of places.

As shown in FIG. 2, the first through-hole 30, which is a through-hole formed above the later-mentioned ejector plate 20, penetrates in a thickness direction of the mold member 12 to communicate with the cavity 14. The first through-hole 30 is provided in plurality according to the shape of the cavity 14. A first extrusion pin 22 is inserted in the first through-hole 30, hence a diameter of the first through-hole 30 is formed slightly larger than a diameter of the first extrusion pin 22.

The second through-hole 32, which is a through-hole communicating with the cavity 14 in a region on an outer side of the ejector plate 20, penetrates in the thickness direction of the mold member 12. A second extrusion pin 24 is inserted in the second through-hole 32, hence a diameter of the second through-hole 32 is formed slightly larger than that of the second extrusion pin 24.

Next, the mold frame 18 will be described. The mold frame 18 prevents deformation of the mold member 12, by supporting a force applied when the upper mold 11 is pressed against the mold member 12 to perform injection molding. If rigidity of the mold frame 18 is lacking, then, when the upper mold 11 is pressed against the mold member 12 during injection molding, deformation of the mold frame 18 and the mold member 12 occurs, and a malfunction such as resin leakage occurs. Therefore, the mold frame 18 is formed with a sufficient width (thickness) below a vicinity of a peripheral section of the mold member 12. Moreover, in order to prevent deformation of the mold member 12, there may be adopted a configuration such that a plurality of unillustrated support columns are disposed in a space on an inner side of the mold frame 18 to support the mold member 12.

The mold frame 18 is provided with a mold frame through-hole 33 and a cut-out section 46. The mold frame through-hole 33 is a through-hole which extends in an up-down direction, and in which the second extrusion pin 24 passing through an inside of the mold frame 18 is inserted.

The mold frame through-hole 33 is formed with an inner diameter substantially equal to that of the second through-hole 32. Moreover, an upper end of the mold frame through-hole 33 communicates with the second through-hole 32, and a lower end thereof communicates with the cut-out section 46.

The cut-out section 46 is a space housing a drive unit of the second extrusion pin 24. The cut-out section 46 is formed by a part of a lower end section of the mold frame 18 being cut out. Note that in order to prevent lowering of rigidity of the mold frame 18, the cut-out section 46 preferably has its volume made as small as possible.

The space on the inner side of the mold frame 18 is provided with the ejector plate 20, the first extrusion pin 22, and a cylinder 28 that configure the first workpiece extrusion unit 50.

The ejector plate 20, which is a plate-like member formed slightly smaller than the mold frame 18 on the inner side of the mold frame 18, is configured to be capable of moving in an ascending/descending direction. Note that in the case where the unillustrated support columns are provided on the inner side of the mold frame 18, the ejector plate 20 should be formed so as to avoid the support columns.

The cylinder 28, which is disposed under the ejector plate 20, moves the ejector plate 20 in the ascending/descending direction.

The first extrusion pin 22 is provided in plurality on the ejector plate 20. The first extrusion pin 22 extends out upwardly from the ejector plate 20, and has its upper section inserted in the first through-hole 30. An upper end 22a of the first extrusion pin 22 is formed so as to be flush with a bottom surface 14a of the cavity 14 at a lowered position of the ejector plate 20. When the ejector plate 20 is raised, the first extrusion pin 22 projects into the cavity 14. Then, the first extrusion pin 22 extrudes the workpiece that has stuck to the cavity 14. Thus, the first workpiece extrusion unit 50 extrudes the workpiece above the ejector plate 20 from the cavity 14.

The second workpiece extrusion unit 60 includes the second extrusion pin 24, an extrusion plate 26, a support section 34, and an elastic member 38.

The second extrusion pin 24 is inserted in the second through-hole 32 and the mold frame through-hole 33. The second extrusion pin 24 extends further than the first extrusion pin 22. An upper end 24a of the second extrusion pin 24 is formed so as to be flush with the bottom surface 14a of the cavity 14 at the lowered position. Moreover, a lower end 24b of the second extrusion pin 24 is attached to the extrusion plate 26 in the cut-out section 46. This second extrusion pin 24 is even more effective when disposed in a position where it extrudes an end section of the cavity 14 extending in a longitudinal direction. This is because, in the cavity 14 that is long and narrow, the workpiece in the end section is likely to be caught in the cavity 14.

The extrusion plate 26 is provided on a lower side of the ejector plate 20, and a portion of the extrusion plate 26 is inserted in the cut-out section 46. The extrusion plate 26 is installed so as to hold the lower end 24b of the second extrusion pin 24 in the cut-out section 46. Moreover, the extrusion plate 26 is configured to be capable of moving in the ascending/descending direction by being guided by a plurality of guide sections 44 each fixed to an upper end of the cut-out section 46 by a bolt 42.

Thickness of the extrusion plate 26 is formed smaller than a height of the cut-out section 46 so that a gap G of a certain width is formed in a height direction between the extrusion plate 26 and the cut-out section 46. This gap G defines a stroke of the second extrusion pin 24. Due to this gap G, the stroke of the second extrusion pin 24 is configured to be smaller than a stroke of the first extrusion pin 22. Note that the gap G in the height direction between the extrusion plate 26 and the cut-out section 46 is preferably configured to be as small as possible in a range enabling extrusion of the workpiece by the second extrusion pin 24. Configuring in this way results in height of the cut-out section 46 being suppressed so that volume of the cut-out section 46 can be reduced, and lowering of rigidity of the mold frame 18 can be suppressed.

A portion of the extrusion plate 26 extends to an outer side of the cut-out section 46, and the support section 34 and the elastic member 38 are installed in the portion.

The elastic member 38 is installed between a back plate 36 fixed to a lower end section of the mold frame 18 by a bolt 40, and the extrusion plate 26. As a result, the elastic member 38 biases the extrusion plate 26 in a raising direction. The elastic member 38, which is disposed between the plurality of guide sections 44, is configured so that the extrusion plate 26 ascends/descends smoothly. Note that a material that exhibits a resilience to compression, such as a coil spring, may be employed as the elastic member 38.

The support section 34, which is a member extending out downwardly of the ejector plate 20, is configured so as to press the extrusion plate 26 in a descending direction so that the extrusion plate 26 operates in conjunction with the ejector plate 20 in such a manner that their operation start timings match. The support section 34 may be formed integrally with the ejector plate 20, or may be a separate member attached to a lower section of the ejector plate 20.

A length of the support section 34 is configured in such a manner that, when the ejector plate 20 is set to the lowered position, the extrusion plate 26 is pressed until it abuts on the back plate 36. Moreover, the support section 34 is preferably provided in a position where the support section 34 opposes the elastic member 38 with the extrusion plate 26 interposed therebetween. By such a disposition being adopted, an acting position of the biasing force of the elastic member 38 and a pressing position of the support section 34 coincide, and ascending/descending operation of the extrusion plate 26 can be smoothly performed.

Note that, depending on the shape of the workpiece, a configuration may be adopted such that a plurality of the second extrusion pins 24 are driven by one extrusion plate 26.

Moreover, as shown in the plan view of FIG. 1, in the case where a plurality of the second extrusion pins 24 are disposed in positions that are separated distance wise, there is provided an extrusion plate 26 that has been divided into a plurality of extrusion plates 26, each being attached to the second extrusion pin 24. By configuring in this way, volume of the cut-out sections 46 housing the extrusion plates 26 can be downsized, and positions of the cut-out sections 46 can be dispersed too, hence lowering of rigidity of the mold frame 18 can be suppressed.

The injection molding mold 10 according to the present embodiment is basically configured as described above, and the operation and advantages thereof will be next described.

The injection molding mold 10 shown in FIGS. 1 and 2 performs molding of the workpiece and extrusion of the workpiece by operating as follows.

First, in an injection molding step, as shown in FIG. 2, the ejector plate 20 descends, and the upper ends 22a of the first extrusion pins 22 are disposed in positions aligned flush with the bottom surface 14a of the cavity 14.

Figure 3:
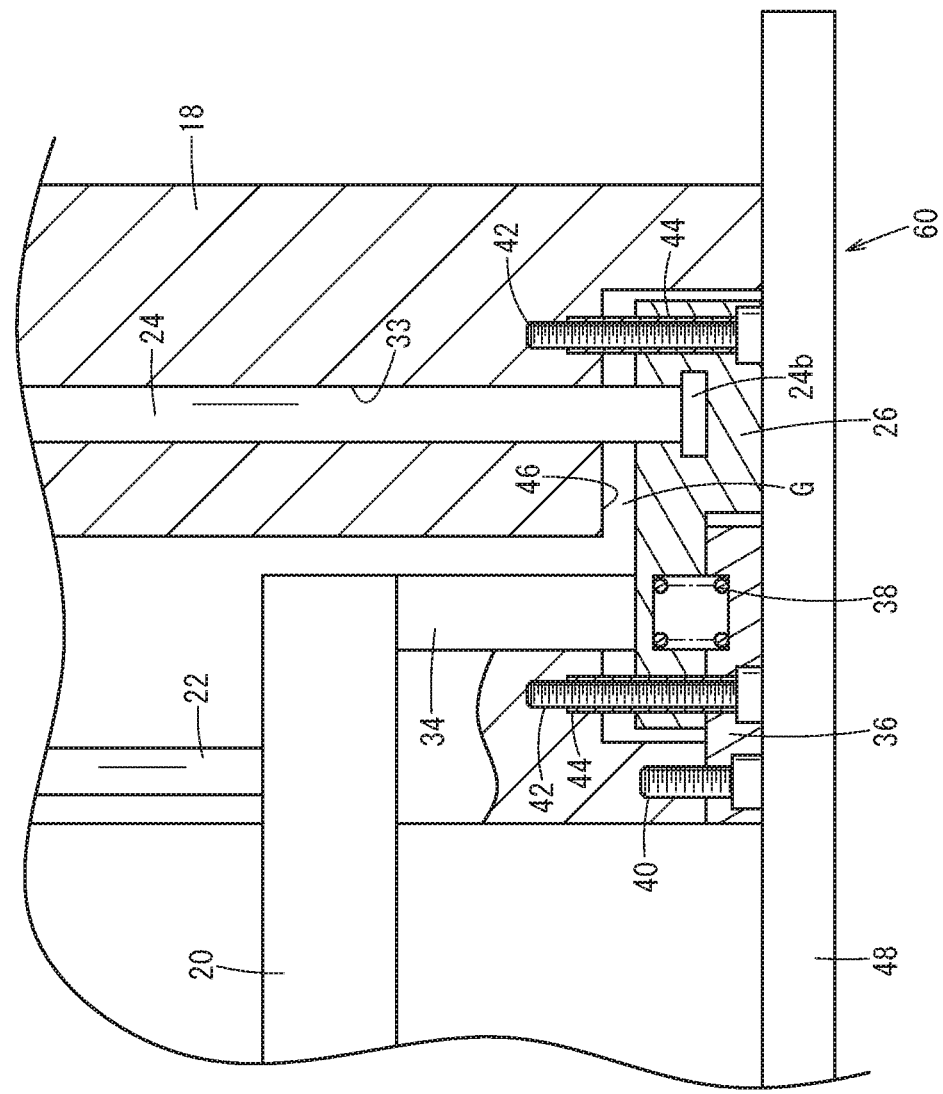
FIG. 3 is an enlarged cross-sectional view showing a state of a second workpiece extrusion unit during injection molding.

At this time, as shown in FIG. 3, the support section 34 presses the extrusion plate 26. As a result, rise of the extrusion plate 26 due to the elastic member 38 is obstructed. Moreover, the upper end 24a of the second extrusion pin 24 is aligned flush with the bottom surface 14a of the cavity 14.

In this state, molten resin is injected into the cavity 14, and is cooled and solidified, whereby the workpiece is molded in the cavity 14.

Figure 4:
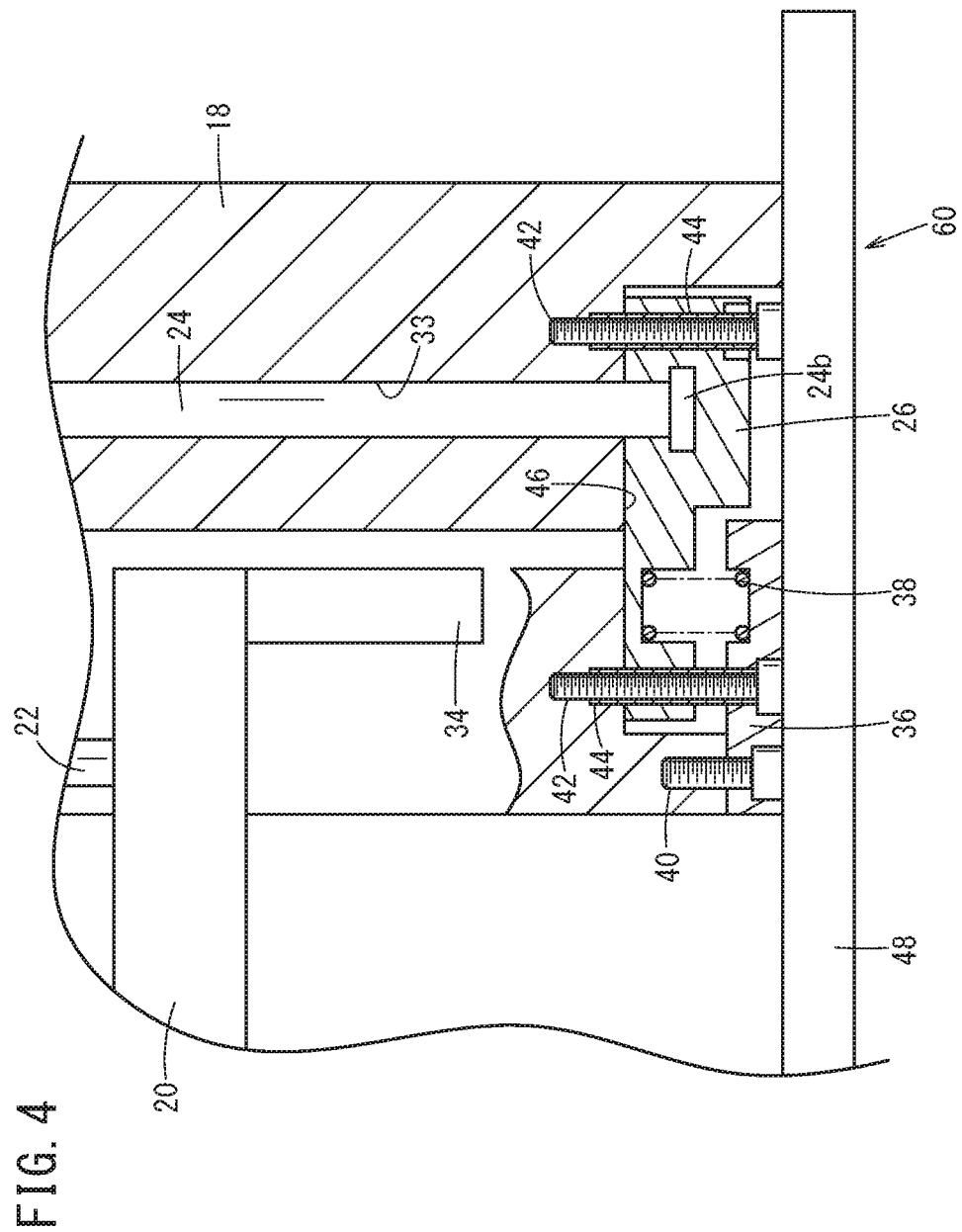
FIG. 4 is an enlarged cross-sectional view showing a state of the second workpiece extrusion unit during workpiece extrusion.

Next, the upper mold 11 is separated from the mold member 12, after which, as shown in FIG. 4, the cylinder 28 (refer to FIG. 2) pushes up the ejector plate 20 to move the ejector plate 20 to a raised position. As a result, the first extrusion pins 22 project into the cavity 14, and the workpiece above the ejector plate 20 is extruded from the cavity 14.

Moreover, with rise of the ejector plate 20, pressing of the extrusion plate 26 by the support section 34 is released. The extrusion plate 26 is pushed up by an elastic force of the elastic member 38, and rises while being guided by the guide sections 44. As a result, the second extrusion pin 24 operates in conjunction with the first extrusion pins 22 in such a manner that their operation start timings match. Rise of the extrusion plate 26 stops by an upper surface of the extrusion plate 26 abutting on the upper end of the cut-out section 46. At this time, the second extrusion pin 24 projects from the cavity 14 to an extent of a height corresponding to the gap G (refer to FIG. 2) between the extrusion plate 26 and the cut-out section 46. As a result, the workpiece formed in the region on the outer side of the ejector plate 20 is extruded by the second extrusion pin 24.

Note that the ejector plate 20 continues to rise even after rise of the extrusion plate 26 has stopped, and stops after having further pushed up the first extrusion pins 22. When rise of the ejector plate 20 has stopped, a lower end of the support section 34 separates upwardly from the extrusion plate 26.

Due to the above operation being performed, the whole of the workpiece is extruded from the cavity 14.

As described above, with the injection molding mold 10 according to the present embodiment, the whole of the workpiece can be extruded from the cavity 14 even when the cavity 14 has been formed on the outer side of the ejector plate 20.

Thus, with the injection molding mold 10 of the present embodiment, the extrusion plate 26 operates in conjunction with the ejector plate 20 by autonomous operation of the support section 34 and the elastic member 38. As a result, the second workpiece extrusion unit 60 can be realized by a simple device configuration.

In addition, the second extrusion pin 24 may be inserted in the mold frame through-hole 33 and the second through-hole 32. According to this configuration, the second workpiece extrusion unit 60 can be disposed without reducing thickness of the mold frame 18, and lowering of strength of the mold frame 18 can be suppressed. Furthermore, since the cut-out section 46 is provided in a mold frame lower section where it is difficult for an effect to be exerted on strength of the mold frame 18, lowering of strength of the mold frame 18 can be suppressed.

Since the second extrusion pin 24 is driven by the biasing force of the elastic member 38, the second workpiece extrusion unit 60 can be simplified without a complicated power source being required. Moreover, by the support section 34 and the elastic member 38, operation of the second extrusion pin 24 can be performed in conjunction with that of the first extrusion pin 22 without a complicated control unit being required, and the second workpiece extrusion unit 60 can be further simplified. Furthermore, rise of the second extrusion pin 24 due to the biasing force of the elastic member 38 can be stopped at a position of the upper end of the cut-out section 46, and the stroke of the second extrusion pin 24 can be regulated without a complicated control mechanism being employed.

Another Embodiment

Figure 5:
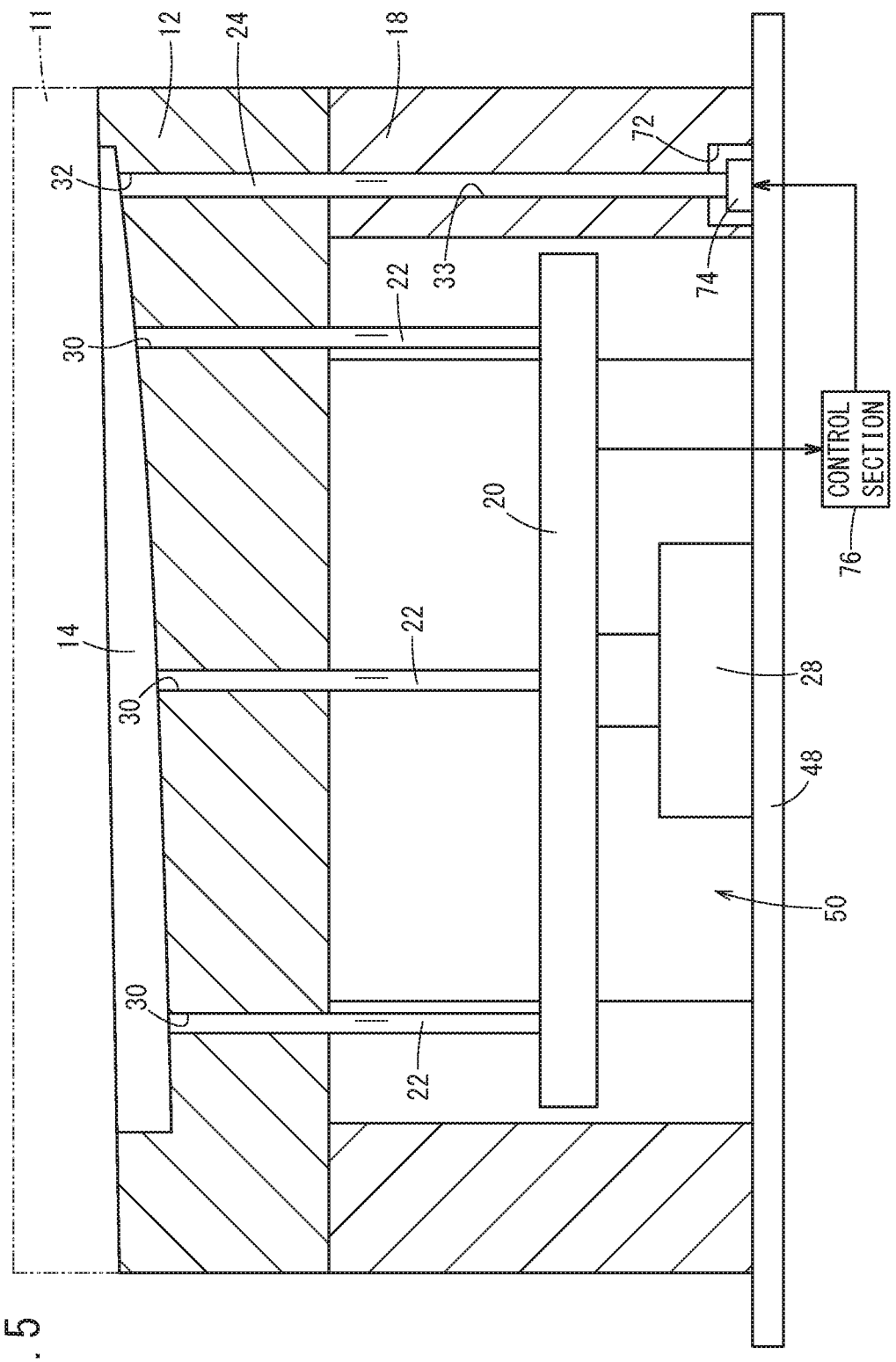
FIG. 5 is a cross-sectional view of an injection molding mold according to another embodiment of the present invention.

As in an injection molding mold 70 according to another embodiment shown in FIG. 5, a cylinder 74 may be provided inside a cut-out section 72, instead of the extrusion plate 26. The cylinder 74, which is attached to a lower end section of the second extrusion pin 24, performs an extrusion operation of the second extrusion pin 24 under control of a control section 76.

The control section 76 detects a position of the ejector plate 20, and drives the cylinder 74 when rise of the ejector plate 20 has been detected. As a result, extrusion can be performed by operating the first extrusion pin 22 and the second extrusion pin 24 in conjunction with each other in such a manner that their operation start timings match.

The injection molding mold 70 also enables the whole of the workpiece to be extruded from the cavity 14, even when the cavity 14 has been formed in the region on the outer side of the ejector plate 20.

Note that the injection molding mold of the present invention is not limited to the above-mentioned embodiments, and it goes without saying that a variety of configurations may be adopted without departing from the spirit of the present invention.

The invention claimed is:

1. An injection molding mold comprising:
   an upper mold;
   a mold member that is disposed below the upper mold;
   a cavity that is provided on a front side of the mold member and forms, between the mold member and the upper mold, a space to be injected with a resin;
   a mold frame that is configured to support the mold member from a back side and is wall-shaped along a peripheral section of the mold member;
   an ejector plate that is provided in a freely ascending/descending manner in a space inside the mold frame on the back side of the mold member;
   a plurality of first through-holes that penetrate the mold member in a thickness direction of the mold member above the ejector plate to communicate with the cavity;
   a first extrusion pin extending out upwardly from the ejector plate, the first extrusion pin being inserted in the first through-hole from the back side of the mold member and configured to extrude a workpiece from the cavity;
   a cut-out section that is formed by a part of a lower end section of the mold frame being cut out on an outer side of the ejector plate;
   a mold frame through-hole that penetrates the mold frame in an up-down direction, a lower end of the mold frame through-hole communicating with the cut-out section;
   a second through-hole that penetrates the mold member in the thickness direction of the mold member on the outer side of the ejector plate and communicates with the mold frame through-hole;
   an extrusion plate that is provided at the cut-out section, being capable of ascending and descending;
   a second extrusion pin that extends upward from the extrusion plate, is inserted in the second through-hole and the mold frame through-hole, and extrudes the workpiece formed in the cavity in a region on an outer side of the ejector plate; and a support section that extends from the ejector plate toward the extrusion plate and makes the extrusion plate operate in conjunction with the ejector plate in such a manner that operation start timings of the extrusion plate and the ejector plate match each other.

2. The injection molding mold according to claim 1, wherein a drive unit configured to drive the second extrusion pin and the extrusion plate is provided inside the cut-out section.

3. The injection molding mold according to claim 2, wherein the drive unit includes an elastic member, and the second extrusion pin and the extrusion plate are driven by a biasing force of the elastic member.

4. The injection molding mold according to claim 3, wherein the support section is formed integrally with the ejector plate, and configured to obstruct rise of the extrusion plate by pressing the extrusion plate at a lowered position of the ejector plate, and release pressing of the extrusion plate at a raised position of the ejector plate at which the first extrusion pin projects from the cavity.

5. The injection molding mold according to claim 4, wherein the extrusion plate is provided on an inner side of the cut-out section formed in the lower end section of the mold frame, and abuts on an upper end of the cut-out section in a state where pressing by the support section has been released.

6. The injection molding mold according to claim 5, wherein a stroke of the second extrusion pin is smaller than a stroke of the first extrusion pin.

7. The injection molding mold according to claim 5, wherein the extrusion plate is guided in an ascending/descending direction by a guide section provided in the mold frame, and the elastic member is installed at a position between a plurality of the guide sections in the extrusion plate.

8. The injection molding mold according to claim 7, wherein the support section is disposed opposing the elastic member.

9. The injection molding mold according to claim 4, wherein the extrusion plate is provided on a lower side of the ejector plate.

10. The injection molding mold according to claim 9, wherein the second extrusion pin is longer than the first extrusion pin.

11. The injection molding mold according to claim 4, wherein the second extrusion pin extrudes an end section in a longitudinal direction of the cavity.

12. The injection molding mold according to claim 4, wherein the extrusion plate is disposed divided into a plurality of portions, each of which is provided with one or a plurality of the second extrusion pins.

* * * * *